United States Patent
Inoue et al.

(10) Patent No.: US 8,713,981 B2
(45) Date of Patent: May 6, 2014

(54) EQUIPMENT OF SUPPLYING LUBRICANT AND METHOD OF SUPPLYING LUBRICANT

(75) Inventors: Tsuyoshi Inoue, Tokyo (JP); Yasuyuki Muramatsu, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/639,198

(22) PCT Filed: Apr. 6, 2011

(86) PCT No.: PCT/JP2011/059124
§ 371 (c)(1),
(2), (4) Date: Oct. 4, 2012

(87) PCT Pub. No.: WO2011/126139
PCT Pub. Date: Oct. 13, 2011

(65) Prior Publication Data
US 2013/0019647 A1    Jan. 24, 2013

(30) Foreign Application Priority Data
Apr. 7, 2010    (JP) .................................. 2010-088371

(51) Int. Cl.
*B21B 45/02*    (2006.01)
*B21B 27/06*    (2006.01)

(52) U.S. Cl.
USPC ................................................ 72/43; 72/201

(58) Field of Classification Search
USPC ............ 72/41, 42, 43, 236, 44, 201; 184/6.21
See application file for complete search history.

(56) References Cited

U.S. PATENT DOCUMENTS

| | | | |
|---|---|---|---|
| 4,738,400 A * | 4/1988 | Irwin | 72/236 |
| 6,134,930 A | 10/2000 | Shore et al. | |
| 7,172,141 B2 * | 2/2007 | Nakayama et al. | 72/42 |
| 2008/0116011 A1 | 5/2008 | Takahama et al. | |
| 2008/0190162 A1 | 8/2008 | Takahama et al. | |

(Continued)

FOREIGN PATENT DOCUMENTS

| | | |
|---|---|---|
| CN | 2628172 | 7/2004 |
| DE | 10-2008-050392 | 12/2009 |

(Continued)

OTHER PUBLICATIONS

International Search Report dated May 24, 2011 issued in corresponding PCT Application No. PCT/JP2011/059124.

(Continued)

*Primary Examiner* — Teresa M Ekiert
(74) *Attorney, Agent, or Firm* — Kenyon & Kenyon LLP

(57) ABSTRACT

The invention provides equipment for supplying lubricant for a rolling roll of a rolling mill comprising a plurality of spray nozzles for spraying a lubricant and a gas in a particulate or atomized state to the rolling roll, a lubricant feed device for feeding the lubricant to the spray nozzles, and a gas feed device for feeding the gas to the nozzles. The amount of lubricant supplied from side spray nozzles is larger than the lubricant feed rate from the center spray nozzle, and the amount of lubricant supplied from the spray nozzles between these side spray nozzles and center spray nozzle is not more than the amount of lubricant from the side spray nozzles and not less than the lubricant from the center spray nozzle. Thus uneven wear and roughness is reduced in the axial direction of the rolling roll.

13 Claims, 5 Drawing Sheets

(56) References Cited

U.S. PATENT DOCUMENTS

| | | |
|---|---|---|
| 2008/0257647 A1 | 10/2008 | Kim et al. |
| 2010/0258380 A1 | 10/2010 | Vervaet et al. |
| 2011/0111124 A1 | 5/2011 | Pawelski et al. |

FOREIGN PATENT DOCUMENTS

| | | |
|---|---|---|
| JP | 03-138014 | 6/1991 |
| JP | 7-290121 | 11/1995 |
| JP | 9-253707 | 9/1997 |
| JP | 2000-197901 | 7/2000 |
| JP | 2002-316202 | 10/2002 |
| JP | 2003-94104 | 4/2003 |
| JP | 2008-213023 | 9/2008 |
| JP | 2009-514686 | 4/2009 |
| JP | 2009-226478 | 10/2009 |
| TW | 460668 | 10/2001 |
| TW | 200624188 | 1/2007 |
| TW | 200624189 | 1/2007 |
| WO | 2007/055503 | 5/2007 |
| WO | WO 2009/046505 | 4/2009 |

OTHER PUBLICATIONS

"Theory and Practice of Flat Product Rolling", The Iron and Steel Institute of Japan, p. 218 (with partial English Translation), Sep. 1, 1984.

Search Report dated Jan. 23, 2014 issued in corresponding European Patent Application No. 11 766 038.1.

* cited by examiner

EQUIPMENT OF SUPPLYING LUBRICANT AND METHOD OF SUPPLYING LUBRICANT

This application is a national stage application of International Application No. PCT/JP2011/059124, filed 6 Apr. 2011, which claims priority to Japanese Application No. 2010-088371, filed 7 Apr. 2010, which is incorporated by reference in its entirety.

TECHNICAL FIELD

The present invention relates to a facility and method of supplying a lubricant which is used in a rolling process, in particular a hot rolling process, in a process of production of steel sheet/strip, steel plate, or other ferrous metal products.

BACKGROUND ART

In a hot rolling process in a process of production of steel sheet/strip, steel plate, or other ferrous metal products, lubricated rolling is performed for lightening the load on the rolling rolls which are used as working tools, reducing wear or seizing and the occurrence of defects caused along with the wear or seizing, securing good surface quality of the products, and various other purposes.

In the hot rolling process, mainly, the method of using the water injection method to spray and supply a mixture of water and lubricant in an emulsion state (for example, see NPLT 1) to the roll, and the method of supplying grease or other semisolid lubricants by air or another gas to deposit it on the rolls, etc. have been used (for example, see PLT 1).

As other lubricated rolling methods, the method of directly pressing a solid form lubricant, which is made by mixing graphite or another solid lubricant with wax, to the roll surface (for example, see PLT 2), and the method of supplying a non-oil type lubricant, which is made by mixing various additives with a colloidal solution, to the rolls or roll bite, etc. are also known.

Further, in recent years, as a method of supplying a lubricant not using water, the method of rendering, not a semisolid grease, but a liquid lubricant which is used in the water injection method into an atomized or particulate state and spraying and supplying this to a roll together with a noncombustible gas has been proposed (PLT 3, below, this method called the "gas atomization method"). According to this method, a small amount of lubricant supply enables a large effect of reduction of the coefficient of friction to be obtained. Furthermore, equipment for lubrication and a method of lubrication for using the gas atomization method in hot rolling of steel sheet/strip have also been proposed (for example, see PLT 4).

On the other hand, to supply a sufficient amount of lubricant to the parts in which lubrication is required during rolling, usually a rolling mill is provided with a plurality of spray nozzles for lubricant supply. A hot rolling mill for steel sheet/strip, as illustrated in PLT 1 or PLT 4, is provided with a lubrication header comprised of a plurality of spray nozzles aligned in the product width direction. Such a configured lubrication header is designed to enable a lubricant to be supplied to the entire region where a roll and steel material contact each other. This lubrication header, while differing depending on the size of the rolling mill, has at least two spray nozzles which are set at substantially equal intervals and in accordance with need is provided with a mechanism which enables selection of the spray nozzles to be used.

Such a lubrication header is usually individually provided for each of the upper and lower work rolls and backup rolls. However, depending on the operating conditions of the rolling processes, sometimes it is set for just one of the upper and lower work rolls or backup rolls. In either case, when using such a lubrication header for lubricated rolling, at the present, at least two spray nozzles are used in one rolling mill for each pass so as to supply the lubricant.

Regarding the device for feeding a lubricant to the spray nozzles, in the water injection method, as shown in FIG. 1, water and a lubricant are fed by separate pumps, that is, a water-feed pump device 3' and a lubricant-feed pump device 3, to a mixer of water and lubricant called an "injector 8". The amount of fed water and lubricant at this time are set so that the emulsion which is produced at the injector 8 becomes a predetermined concentration. The emulsion of the predetermined concentration which is produced at the injector 8 is fed through pipes which are branched in the span from the injector 8 to the spray nozzles 1' to be fed to the plurality of spray nozzles 1'.

The lubricant concentration of the emulsion is, in hot rolling of steel sheet/strip, 0.2 to 1 vol % or so. The amount of the supplied emulsion as a whole reaches several liters to tens of liters per minute per pass.

To supply such a large amount of emulsion, a relatively high pressure has to be applied to spray it from the spray nozzles. Therefore, the speed of feed of the emulsion in the pipes is large, and thus there is no time for the emulsion to separate into water and a lubricant, so the spray nozzles are fed comparatively evenly with substantially the same amounts of emulsion which are then sprayed to the roll. Therefore, in the case of the water injection method, for convenience in laying the piping, equipment for supplying a lubricant which is provided with two sets of pump devices for upper roll and lower roll is usually used. One set of pump devices is used to feed emulsion to two or more spray nozzles.

Regarding the gas atomization method, equipment for supplying a lubricant and method of supplying a lubricant which use a lubrication header which is provided with so-called internal mixing type two-fluid spray nozzles which are provided with mixing chambers at which the lubricant and gas are mixed inside the spray nozzles are disclosed in PLT 4. With this equipment of supplying a lubricant and method of supplying a lubricant, the lubricant is fed to the spray nozzles as much as possible without pressure in the lubricant pipes. Gas of less than 0.5 bar (0.05 MPa) is used to render the lubricant into a particulate or atomized state and spray and supply it from the spray nozzles.

PLT 6 discloses a method of supplying a lubricant and equipment for supplying a lubricant which are designed to prevent scatter even if floating mist not deposited on the roll is formed when rendering a lubricant to the particulate or atomized state and spraying and supplying it from the spray nozzles by the gas atomization method. In the system described in PLT 6, an air spraying mechanism is provided as a secondary nozzle at the outside of the flow paths of the spray nozzles through which the lubricant is sprayed. At the time of spraying the lubricant, air is blown from the air spraying mechanism to form a wall of air to thereby suppress splatter of the floating mist.

CITATIONS LIST

Patent Literature

PLT 1: Japanese Patent Publication No. 2002-316202 A1
PLT 2: Japanese Patent Publication No. 2000-197901 A1
PLT 3: Japanese Patent Publication No. 2003-94104 A1
PLT 4: International Publication No. 2009/046505

PLT 5: Japanese Patent Publication No. 07-290121 A1
PLT 6: Japanese Patent Publication No. 2008-213023 A1

Non Patent Literature

NPLT 1: the Iron and Steel Institute of Japan, "Theory and Practice of Flat Product Rolling", p. 218

SUMMARY OF INVENTION

Technical Problem

In this regard, in rolling of a metal material, in particular hot rolling of steel sheet/strip, uneven wear and roughness occur in the axial direction of a rolling roll. However, when using the water injection method, as explained above, it becomes necessary to supply a large amount of lubricant as the emulsion state to the roll, and thus it is difficult to adjust the amount of lubricant supplied locally in the axial direction of a rolling roll and impossible to suppress uneven wear or roughness in the axial direction.

Further, with the method which uses the gas atomization method which is described in PLT 4, a lubricant is fed from a lubricant distributor to the spray nozzles. Basically, the same amounts of lubricant are fed from the spray nozzles. Further, no consideration is given to adjusting the amount of lubricant supplied locally in the axial direction of the rolling roll. It is not possible to suppress uneven wear or roughness in the axial direction.

Therefore, an object of the present invention is to provide equipment for supplying lubricant and lubricant supply method which can locally adjust the amount of lubricant supplied in an axial direction of a rolling roll to thereby effectively suppress uneven wear or roughness in the axial direction.

Solution to Problem

The inventors engaged in intensive studies to solve the above problem by the feed of a lubricant by the gas atomization method and as a result obtained the following discoveries.

Uneven wear and roughness at the rolling roll surface easily occur near the roll surface where the vicinities of the ends, in the width direction, of the rolled material, that is, the steel sheet, contact.

Therefore, by relatively increasing the amounts of spray of a lubricant near the contacting parts at the ends of the steel sheet and relatively decreasing the amounts at the center of the steel sheet as the basic pattern of distribution, it is possible to efficiently avoid uneven wear and roughness of the roll.

The present invention was made based on these discoveries and has as its gist the following:

(1) Equipment for supplying a lubricant for a rolling roll of a rolling mill for a flat shaped metal material, comprising: a plurality of spray nozzles which are arranged in an axial direction of the rolling roll and which spray a lubricant toward the rolling roll together with a gas in a particulate or atomized state; a lubricant feed device which feeds a lubricant to the spray nozzles; and a gas feed device which feeds a gas to the spray nozzles, wherein when designating, the spray nozzles which are positioned at the both ends among the spray nozzles which supply a lubricant to the parts of the rolling roll corresponding to the width of the flat shaped metal material as the side spray nozzles and designating the spray nozzles which are positioned at the center as the center spray nozzles, the amount of lubricant supplied from the side spray nozzles are larger than the amount of lubricant supplied from the center spray nozzles and the amount of lubricant supplied from the spray nozzles between these side spray nozzles and center spray nozzles are not more than the amount of lubricant supplied from the side spray nozzles and not less than the amount of lubricant supplied from the center spray nozzles.

Note that, the "amount of a supplied lubricant" means the amount of lubricant which is fed per unit surface area of the rolling roll per unit time.

(2) Equipment for supplying a lubricant for rolling mill as set forth in (1), wherein the amount of lubricant supplied from the spray nozzles between these side spray nozzles and center spray nozzles become smaller from the sides toward the center of the rolling roll.

(3) Equipment for supplying a lubricant for rolling mill as set forth in (1) or (2), wherein the amount of lubricant supplied from the side spray nozzles are up to 5 times the amount of lubricant supplied from the center spray nozzles.

(4) Equipment for supplying a lubricant for rolling mill as set forth in (3), wherein the amount of lubricant supplied from the side spray nozzles are up to 2 times the amount of lubricant supplied from the center spray nozzles.

(5) Equipment for supplying a lubricant for rolling mill as set forth in any one of (1) to (4), wherein the lubricant feed device can individually control the amount of lubricant supplied from the spray nozzles.

According to the above (5), it is possible to individually control the amount of lubricant supplied from the nozzles, and thus a suitable end rich distribution pattern can be realized even when the width of the flat shaped metal material differs for each rolling chance.

(6) Equipment for supplying a lubricant for rolling mill as set forth in (5), wherein when divided into spray nozzle groups comprised of adjoining spray nozzles, a spray nozzle interval in at least one spray nozzle group differs from the spray nozzle intervals in the other spray nozzle groups.

(7) Equipment for supplying a lubricant for rolling mill as set forth in (5), wherein the plurality of spray nozzles are comprised of a plurality of roll end spray nozzles which supply a lubricant to end regions of the rolling roll and a plurality of roll center spray nozzles which supply a lubricant to a center region of the roll and wherein an interval between the roll end spray nozzles and an interval between the roll center spray nozzles differ.

(8) Equipment for supplying a lubricant for rolling mill as set forth in (7), wherein the interval between the roll center spray nozzles is broader than the interval between the roll end spray nozzles.

(9) Equipment for supplying a lubricant for rolling mill as set forth in (8), wherein the interval between the roll center spray nozzles is not less than 1.5 times the interval between the roll end spray nozzles.

(10) Equipment for supplying a lubricant for rolling mill as set forth in any one of (5) to (9), wherein the lubricant feed device provides the same number of pump devices as the number of spray nozzles and each pump device feeds a lubricant to a single corresponding spray nozzle.

(11) Equipment for supplying a lubricant for rolling mill as set forth in any one of (5) to (9), wherein the lubricant feed device provides the same number of flow regulators as the number of spray nozzles and each flow regulator controls the amount of lubricant fed to a single corresponding spray nozzle.

(12) Equipment for supplying a lubricant for rolling mill as set forth in any one of (5) to (11), wherein the lubricant feed device individually controls the amount of lubricant supplied from the spray nozzles for each spray nozzle in accordance with a parameter relating to the surface of the rolling roll.

According to the above (12), it is possible to monitor the state of the roll surface (for example, amount of wear or roughness) and control the amount of lubricant individually in accordance with the situation so as to more efficiently avoid uneven wear and roughness of the roll.

(13) Equipment for supplying a lubricant for rolling mill as set forth in (12), wherein the parameter relating to the surface of the rolling roll is the amount of wear of the rolling roll and wherein the lubricant feed devices increase the amount of lubricant supplied to regions of the rolling roll with relatively large amounts of wear compared with regions of the rolling roll with relatively small amounts of wear.

(14) Equipment for supplying a lubricant for rolling mill as set forth in (12) or (13), wherein the parameter relating to the surface of the rolling roll is a surface roughness and wherein the lubricant feed devices increase the amount of lubricant supplied to regions of the rolling roll with relatively large surface roughnesses compared with regions of the rolling roll with relatively small surface roughnesses.

(15) Equipment for supplying a lubricant for rolling mill as set forth in any one of (1) to (14), wherein at least part of the spray nozzles are internal mixing type spray nozzles, the lubricant has a dynamic viscosity at 40° C. of 60 to 800 cSt, the gas feed devices feed the spray nozzles gas at 0.05 MPa or more pressure, and the lubricant feed devices feed the internal mixing type spray nozzles a lubricant by a pressure of at least the pressure of the gas in the mixing chambers of the spray nozzles.

(16) Equipment for supplying a lubricant for rolling mill as set forth in any one of (1) to (15), wherein at least part of the spray nozzles are external mixing type spray nozzles, the lubricant has a dynamic viscosity at 40° C. of 60 to 800 cSt, the gas feed device feeds the spray nozzles gas at 0.05 MPa or more pressure, and the lubricant feed devices feed the external mixing type spray nozzles a lubricant by a pressure of at least 0.01 MPa and less than the feed pressure of gas to the spray nozzles.

(17) Equipment for supplying a lubricant for rolling mill as set forth in (15) or (16), wherein the spray nozzles are comprised of internal mixing type spray nozzles and external mixing type spray nozzles, internal mixing type spray nozzles are arranged at the center in the width direction of the flat shaped metal material, and external mixing type spray nozzles are arranged at the outsides.

(18) Equipment for supplying a lubricant for rolling mill as set forth in any one of (1) to (17), wherein the spray nozzles have water spray parts which spray water so that water films are formed at outsides of spray cones of lubricant and gas from the spray nozzles.

(19) A method of supplying a lubricant to a surface of a rolling roll, comprising: spraying a lubricant from a plurality of spray nozzles toward the rolling roll together with a gas in a particulate or atomized state, wherein when designating the spray nozzles which are positioned at the both ends among the spray nozzles which supply a lubricant to the parts of the rolling roll corresponding to the width of a flat shaped metal material as the side spray nozzles and designating the spray nozzles which are positioned at the center as the center spray nozzles, at the spraying from the spray nozzles, the amount of lubricant supplied from the side spray nozzles is increased over the amount of lubricant supplied from the center spray nozzles and the amount of lubricant supplied from the spray nozzles between these side spray nozzles and center spray nozzles are made not more than the amount of lubricant supplied from the side spray nozzles and not less than the amount of lubricant supplied from the center spray nozzles.

(20) A method of supplying a lubricant to a rolling mill as set forth in (19), wherein the amount of lubricant supplied from the spray nozzles between these side spray nozzles and center spray nozzles are made gradually smaller from the sides toward the center of the rolling roll.

(21) A method of supplying a lubricant to a rolling mill as set forth in (19) or (20), wherein the amount of lubricant supplied from the side spray nozzles is made up to 5 times the amount of lubricant supplied from the center spray nozzles.

(22) A method of supplying a lubricant to a rolling mill as set forth in (21), wherein the amount of lubricant supplied from the side spray nozzles is made up to 2 times the amount of lubricant supplied from the center spray nozzles.

(23) A method of supplying a lubricant to a rolling mill as set forth in any one of (19) to (22), wherein the amount of lubricant supplied from the spray nozzles can be controlled for each spray nozzle in accordance with a parameter relating to the surface of the rolling roll.

(24) A method of supplying a lubricant to a rolling mill as set forth in (23), wherein the parameter relating to the surface of the rolling roll is the amount of wear of the rolling roll and wherein the amount of lubricant supplied to regions of the rolling roll with relatively large amounts of wear is increased compared with regions of the rolling roll with relatively small amounts of wear.

(25) A method of supplying a lubricant to a rolling mill as set forth in (23) or (24), wherein the parameter relating to the surface of the rolling roll is a surface roughness and wherein the amount of lubricant supplied to regions of the rolling roll with relatively large surface roughnesses is increased compared with regions of the rolling roll with relatively small surface roughnesses.

(26) A method of supplying a lubricant to a rolling mill as set forth in any one of (23) to (25), wherein each spray nozzle is fed with a lubricant from a pump device for the spray nozzle and the amount of lubricant fed from the spray nozzles are controlled by changing the outputs of the pump devices corresponding to the spray nozzles.

(27) A method of supplying a lubricant to a rolling mill as set forth in any one of (23) to (25), wherein each spray nozzle is fed with a lubricant through a flow regulator for the spray nozzle and the amount of lubricant fed from the spray nozzles are controlled by changing the opening degrees of the flow regulators corresponding to the spray nozzles.

(28) A method of supplying a lubricant to a rolling mill as set forth in any one of (19) to (27), wherein at least part of the spray nozzles are internal mixing type spray nozzles, the lubricant has a dynamic viscosity at 40° C. of 60 to 800 cSt, and the gas is fed to the internal mixing type spray nozzles at 0.05 MPa or more pressure and the lubricant is fed at a pressure of not less than the pressure of the gas in the mixing chambers of the spray nozzles.

(29) A method of supplying a lubricant to a rolling mill as set forth in any one of (19) to (28), wherein at least part of the spray nozzles are external mixing type spray nozzles, the lubricant has a dynamic viscosity at 40° C. of 60 to 800 cSt, and the gas is fed to the external mixing type spray nozzles at 0.05 MPa or more pressure and the lubricant is fed at a pressure of not less than 0.01 MPa and not more than the feed pressure of gas to the spray nozzles.

(30) A method of supplying a lubricant to a rolling mill as set forth in any one of (19) to (29), further comprising forming water films at outsides of spray cones of a lubricant and gas from the spray nozzles.

Advantageous Effects of Invention

According to the equipment for supplying a lubricant and methods of supplying a lubricant according to the present invention, the amount of lubricant supplied from the spray nozzles which are positioned close to the both ends among the plurality of spray nozzles which are arranged in the axial direction of the rolling roll are made larger than the amount of lubricant supplied from the spray nozzles which are positioned near the center. Due to this, the amount of lubricant supplied near the both ends of the rolling roll where wear and roughness occur most easily become greater and wear and roughness of the rolling roll at those regions are suppressed. As a result, the occurrence of uneven wear and roughness at the rolling roll in the axial direction of the rolling roll are suppressed. For this reason, there is the effect of prolongation of the roll exchange period and the avoidance of product defects due to sporadic formation of flaws of course while stabilization of the roll profile is also contributed to, so it is also possible to obtain the effect of improvement of precision in control of the thickness and control of the shape of flat shaped metal materials.

Below, the present invention will be able to be understood much more clearly from the attached drawings and the preferred embodiments of the present invention.

DESCRIPTION OF EMBODIMENTS

Figure 1:
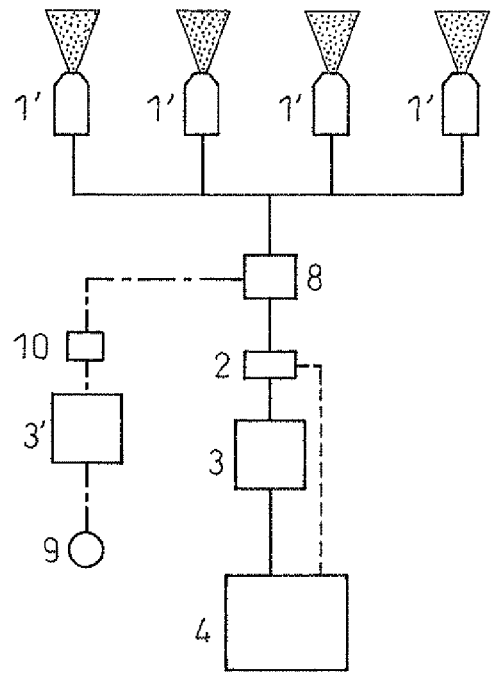
FIG. 1 is a schematic view which shows a configuration of equipment for supplying a lubricant (water injection method) according to the prior art.

Below, referring to the figures, embodiments of the present invention will be explained in detail. Note that, in the following explanation, similar constituent elements are assigned the same reference numerals.

Figure 2:
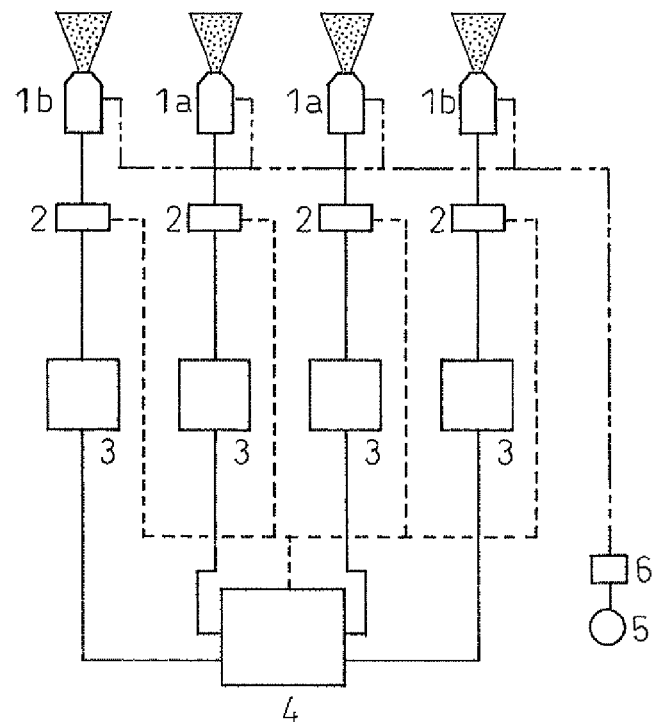
FIG. 2 is a schematic view which shows a configuration of equipment for supplying a lubricant according to the present invention.

One example of the configuration of the equipment for supplying a lubricant according to the present invention is shown in FIG. 2. As shown in this figure, the equipment for supplying a lubricant according to the present invention is provided with a plurality of spray nozzles 1a and 1b, pump devices 3 which are connected to these spray nozzles 1a and 1b and feed a lubricant to these spray nozzles 1a and 1b, and a lubricant storage tank 4 which stores the lubricant. The lubricant which is stored inside the lubricant storage tank 4 is fed by the pump devices 3 to the spray nozzles 1a and 1b.

As shown in FIG. 2, the same number of pump devices 3 as the number of spray nozzles are provided. One pump device 3 is connected to each of the spray nozzles 1a and 1b. Due to this, the amount of the lubricant fed to the spray nozzles 1a and 1b can be set in advance for the spray nozzles 1a and 1b and can be individually adjusted during rolling for each of the spray nozzles 1a and 1b.

Here, as a pump device 3, any type of pump device may be used so long as being equipped with a constant rate discharge mechanism. For example, a precision gear pump, trochoid pump, rocking type pump, plunger pump, etc. may be used. The "pump device which has a constant discharge function" referred to here is one where the precision in setting the amount of supplied lubricant is kept to a fluctuation of not more than 20% of the set value and has the function of enabling change of the amount of supplied lubricant at a speed of 0.1 cc/min or more per second.

Note that, as the pump device 3, a configuration where two or more pump devices are connected and set in parallel and made to appear to function as a single pump device is also possible. By doing this, the range of setting of the amount of supplied lubricant can be easily broadened. For the constant discharge function in the case of setting a plurality of pump devices in parallel, the individual pump devices which are set in parallel should have that constant discharge function.

To set and/or adjust the amount of the lubricant supplied to any values for the spray nozzles all at once, there is the method of simultaneously interlockingly operating electrical devices for adjusting the constant discharge functions of the pumps and the method of using a pump device which is provided with a plurality of pump mechanisms while being a single pump device, such as a planetary multiport gear pump. In the latter case, the number of the pump mechanisms which are provided in the pump device corresponds to the number of pump devices 3. For example, in a six-port planetary type gear pump, this is deemed as a device provided with six pump devices 3. For this reason, while in actuality a single pump device, it is deemed as six pump devices 3, so this is one aspect of the present invention.

Between the spray nozzles 1a and 1b and the pump devices 3, lubricant switches 2 may be provided for turning the supply of a lubricant ON/OFF. This enables the supply of a lubricant to be turned ON/OFF at suitable timings.

Note that, the lubricant switches 2 are not essential. However, in a normal rolling mill, the pump devices 3 and spray nozzles 1 are almost always set separated by distances of at least 1 meter or more. Under such a situation, if just turning the pump devices 3 ON/OFF to turn the supply of a lubricant ON/OFF, sometimes it is not possible to perform the lubricated rolling at a suitable timing. In such a case, it is effective to introduce lubricant switches 2. On the other hand, if the pump devices 3 and the spray nozzles 1 are within 1 meter of each other, there is little need to provide the lubricant switches 2.

When using a switching valve for a lubricant switch 2, at the lubricant ON setting, that is, when spraying a lubricant from the spray nozzle, the lubricant is discharged to the spray nozzle. On the other hand, at the lubricant OFF setting, that is, when not spraying a lubricant from the spray nozzle, the lubricant passes through the route which is shown by the broken lines in FIG. 2 and is returned to the lubricant storage tank 4. It may also be returned to the lubricant pipe between the pump device 3 and the lubricant storage tank 4.

Further, the equipment for supplying a lubricant according to the present invention is provided with a noncombustible gas source 5 which is connected to the spray nozzles 1a and 1b and feeds air or a noncombustible gas or other gas to these spray nozzles 1a and 1b. In particular, in the present embodiment, the equipment for supplying a lubricant is provided with only one noncombustible gas source 5. Pipes are branched from this single noncombustible gas source 5 whereby gas is fed to the spray nozzles 1a and 1b.

Between the spray nozzles 1a and 1b and the noncombustible gas source 5, as shown in FIG. 2, a gas switch 6 may be installed for turning the feed of gas ON/OFF. This enables the feed of gas to the spray nozzles to be turned ON/OFF in accordance with need.

Note that, in the example which is shown in FIG. 2, the gas switch 6 is installed right after the noncombustible gas source 5. Between the gas switch 6 and the spray nozzles 1a and 1b, piping is branched into exactly the number of pipes corresponding to the spray nozzles. Due to this, the individual spray nozzles can be fed with gas. However, if individually turning the feed of gas ON/OFF for each spray nozzle, it is sufficient to branch the piping between the gas switch 6 and the noncombustible gas source 5 into a number of branches corresponding to the number of spray nozzles and set a number of gas switches 6 corresponding to the number of spray nozzles in the branched pipes.

As the gas, use of the industrially frequently used air or nitrogen is preferable cost wise, anything may be used as long as it is noncombustible. Argon or helium are also possible.

The noncombustible gas source 5 is provided with the function of adjusting the pressure of the gas which is fed to the spray nozzles. Due to this, the spray pressure of the gas from the spray nozzles can be adjusted to the suitable pressure. Note that, in the example which is shown in FIG. 2, the spray nozzles are fed with gas of the same pressure. However, if desiring to individually change the spray pressure for each spray nozzle, it is possible to introduce pressure adjusting devices inside the branched pipes so as to set/adjust the feed pressures of the gas to the spray nozzles.

The spray nozzles 1a and 1b spray a lubricant which is fed from the pump devices 3 together with gas which is fed from the noncombustible gas source 5 toward the rolling roll 20 (see FIG. 5) in a particulate or atomized state. As such spray nozzles 1a and 1b, internal mixing type two-fluid spray nozzles 1a such as shown in FIG. 3 and external mixing type two-fluid spray nozzles 1b such as shown in FIG. 4 are used.

Figure 3:
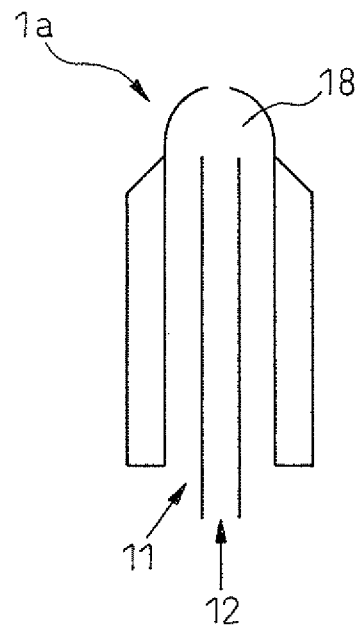
FIG. 3 is a cross-sectional view of an internal mixing type two-fluid spray nozzle which is used in the present invention.
Figure 4:
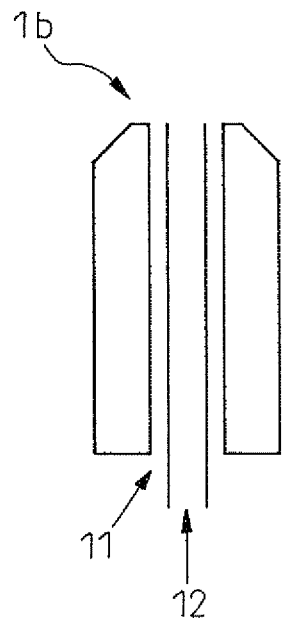
FIG. 4 is a cross-sectional view of an external mixing type two-fluid spray nozzle which is used in the present invention.

In an internal mixing type two-fluid spray nozzle 1a, as shown in FIG. 3, the inside of the spray nozzle is provided with a chamber (mixing chamber) 18 for mixing the gas 11 and the lubricant 12. On the other hand, in an external mixing type two-fluid spray nozzle 1b, as shown in FIG. 4, such a chamber is not provided. The gas 11 and the lubricant 12 are mixed outside of the spray nozzle 1b. In the present embodiment, part of the spray nozzles of the plurality of spray nozzles are made internal mixing type two-fluid spray nozzles 1a, while the remainder are made external mixing type two-fluid spray nozzles 1b. However, it is also possible to configure all of the spray nozzles as just either spray nozzles of internal mixing type two-fluid spray nozzles and external mixing type two-fluid spray nozzles.

Figure 5:
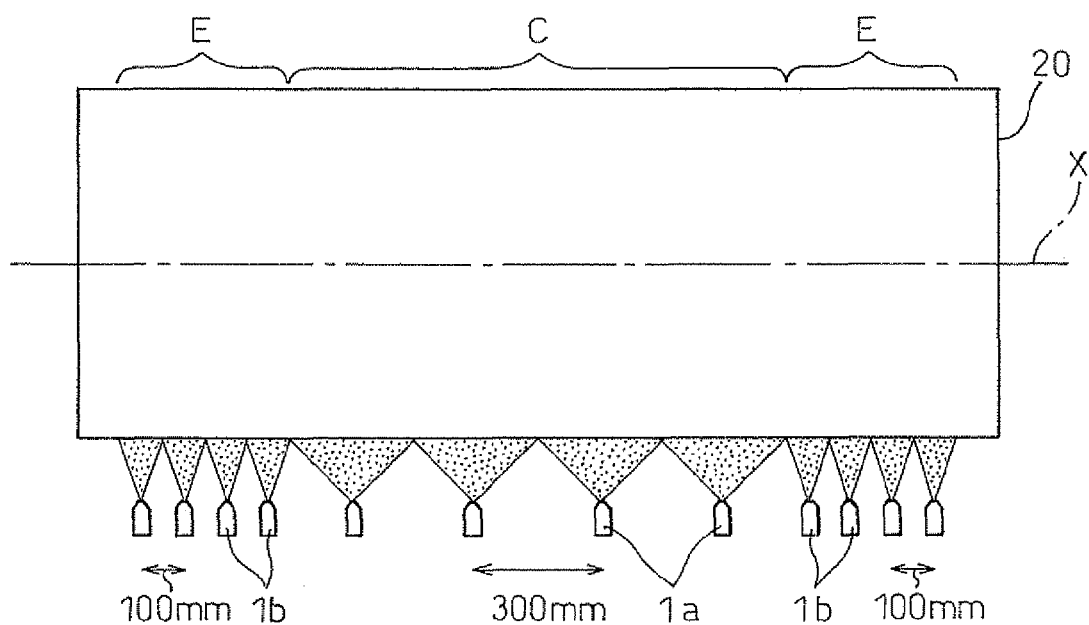
FIG. 5 is a schematic view which shows the arrangement of spray nozzles in the equipment for supplying a lubricant according to the present invention.

FIG. 5 shows the arrangement of the spray nozzles 1a and 1b in the equipment for supplying a lubricant of the present invention. As will be understood from FIG. 5, the spray nozzles 1a and 1b are arranged in the axial direction X of the rolling roll 20. In particular, in the illustrated embodiment, the spray nozzles 1a and 1b are arranged in a line in the axial direction X of the rolling roll 20, but these spray nozzles 1a and 1b may also be arranged offset in the direction perpendicular to the axial direction X of the rolling roll 20.

Further, as will be understood from FIG. 5, the intervals of arrangement between the spray nozzles 1a and 1b differ. In the illustrated embodiment, the interval between the spray nozzles 1a which spray a lubricant to the center region C which is positioned at the center in the axial direction X of the rolling roll 20 (center spray nozzles) is broader than the interval between the spray nozzles 1b which spray a lubricant to the end regions E which are positioned at the two ends in the axial direction X of the rolling roll 20 (end spray nozzles).

In the illustrated example, the width of the rolling roll 20 (length in the axial direction X) is 2000 mm, the center region C is a region of 1200 mm at the center of the rolling roll, and the end regions E are regions of 400 mm from the ends of the rolling roll 20. The interval between spray nozzles 1a which spray a lubricant at the center region C is made 300 mm, while the interval between spray nozzles 1b which spray a lubricant at the end regions E is made 100 mm. Therefore, in the present embodiment, the interval between spray nozzles 1a which spray a lubricant at the center region C is three times the interval between spray nozzles 1b which spray a lubricant at the end regions E. Note that, the ratio of the intervals is preferably 1.5 or more.

Further, in the illustrated embodiment, the spray nozzles 1a which spray a lubricant at the center region C of the rolling roll 20 are formed by internal mixing type two-fluid spray nozzles 1a, while the spray nozzles 1b which spray a lubricant at the end regions E of the rolling roll 20 are formed by external mixing type two-fluid spray nozzles 1b.

Note that, in the above embodiment, the nozzle interval is changed between the spray nozzles which spray a lubricant at the center region C and the spray nozzles which spray a lubricant at the end regions E. However, the nozzle interval does not necessarily have to be changed in two stages in this way. It may also be changed in three stages or more stages. Alternatively, all nozzle intervals may be made different. If changing the way of looking at this, in the present invention, when dividing all of the spray nozzles into groups of spray nozzles comprised of adjoining spray nozzles, it can be said that the spray nozzles are arranged so that the nozzle interval in at least one spray nozzle group differs from the nozzle intervals in the other spray nozzle groups.

Further, in the above example, the center region C is the center 1200 mm region of the rolling roll, and the end regions E are the regions of 400 mm from the ends of the rolling roll 20. However, the relationship between the center region C and the end regions E does not necessarily have to be such a relationship. It is also possible to make the center region C the center 800 mm of the rolling roll and make the end regions E the regions of 800 mm from the ends of the rolling roll 20 or make other various relationships.

In addition, it is also possible to change the boundaries of the center region and the end regions in accordance with the width of the metal material which is being rolled. For example, in one region in the axial direction of a rolling roll, a single spray nozzle having a wide spray angle and a plurality of spray nozzles each having a narrow spray angle are provided in multiple stages. At this time, the region of the rolling roll which can be fed with a lubricant from the single spray nozzle having a wide spray angle is made the same as the region of the rolling roll which can be fed with a lubricant from the plurality of spray nozzles each having a narrow spray angle. Due to this, it becomes possible to select between supplying a lubricant to a certain region of the rolling roll from a single spray nozzle having a wide spray angle and supplying a lubricant from a plurality of spray nozzles each having a narrow spray angle.

According to the present invention, the nozzle interval of the spray nozzles 1b which spray a lubricant to the end regions E becomes smaller than the nozzle interval of the spray nozzles 1a which spray a lubricant to the center region C. For this reason, it is possible to finely adjust the regions of spraying a lubricant to the rolling roll 20 in accordance with the width of the flat shaped metal material (for example, steel sheet) which is rolled by the rolling roll 20 (length of flat shaped metal material in direction vertical to direction of progression). Due to this, substantially no lubricant is supplied any longer to the regions of the rolling roll 20 which are positioned outside from the two edges of the flat shaped metal material, and thus the amount of consumption of the lubricant can be kept down.

Further, in general, the rolling roll 20 is more susceptible to wear and roughness at the end regions E rather than the center region C. With respect to this, in the present invention, the nozzle interval of the spray nozzles 1b which spray a lubricant to the end regions E is made narrow, and thus it is possible to finely control the spray of a lubricant to the end regions E of the rolling roll 20.

Furthermore, in the present embodiment, for the spray nozzles which spray a lubricant at the center region C, internal mixing type two-fluid spray nozzles are used, while for the spray nozzles which spray a lubricant at the end regions E, external mixing type two-fluid spray nozzles are used. Here, internal mixing type two-fluid spray nozzles are provided with mixing chambers at the tips of the nozzles, and thus it is easy to change the shapes of the injection ports of the spray nozzles and use as flat nozzles is possible. Flat nozzles enable broad widths of spray of a lubricant by single spray nozzles. For this reason, it is preferable to use internal mixing type two-fluid spray nozzles for the spray nozzles which spray a lubricant to the center region C.

Next, the method of supplying a lubricant in equipment for supplying a lubricant which is configured in this way will be explained.

In this regard, in rolling of a metal material, in particular in hot rolling of steel sheet, uneven wear occurs in the axial direction of the rolling roll. In particular, when evenly coating the surface of a rolling roll with a lubricant, the amount of wear tends to become greater near ends in the axial direction of a rolling roll rather than near the center in the axial direction.

Therefore, in the present invention, the amount of lubricant supplied to the spray nozzles are set in advance for each spray nozzle so that the amount of lubricant supplied change near the center and near the ends in the axial direction of a rolling roll. FIG. 6(A) and FIG. 6(B) are schematic views which show amount of lubricant supplied from the spray nozzles in the equipment for supplying a lubricant of the present invention. FIG. 6(A) is a view which is similar to FIG. 5 and shows a rolling roll 20 and a plurality of spray nozzles. In particular, the spray nozzles of FIG. 6(A) are assigned numbers ascending from the left side to the right side in the figure. In the illustrated example, the leftmost side spray nozzle is the #1 nozzle, while the rightmost side spray nozzle is the #12 nozzle. In particular, in the present embodiment, the #1 nozzle to the #4 nozzle and the #9 nozzle to the #12 nozzle are external mixing type two-fluid spray nozzles, while the #5 nozzle to the #8 nozzle are internal mixing type two-fluid spray nozzles.

Further, the broken lines in FIG. 6(A) and FIG. 6(B) show the flat shaped metal material M which is rolled by the rolling roll 20. Therefore, in the illustrated example, a metal material with a width which is somewhat narrower than the width of the rolling roll 20 is rolled by the rolling roll 20.

The graph of FIG. 6(B) shows the amount of lubricant supplied to the surface of the rolling roll 20. The abscissa in this graph indicates the position in the axial direction of the rolling roll 20, while the ordinate indicates the amount of lubricant which is supplied per unit time per unit surface area of the rolling roll 20 (Note that, in the Description, the "amount of supplied lubricant" means the "amount of lubricant which is supplied per unit surface area per unit time").

As will be understood from FIG. 6(B), in the present embodiment, the amount of lubricant supplied from the #3 nozzle and the #10 nozzle are greater than the amount of lubricant supplied from the #6 nozzle and the #7 nozzle. Further, the amount of lubricant supplied from the spray nozzles between the #3 nozzle and the #6 nozzle (that is, the #4 nozzle and the #5 nozzle) are not more than the amount of lubricant supplied from the #3 nozzle and are not less than the amount of lubricant supplied from the #6 nozzle. Further, the amount of lubricant supplied from the spray nozzles between the #7 nozzle and the #10 nozzle (that is, the #8 nozzle and the #9 nozzle) are not less than the amount of lubricant supplied from the #7 nozzle and are not more than the amount of lubricant supplied from the #10 nozzle. In particular, in the illustrated example, the amount of lubricant supplied becomes gradually smaller from the #3 nozzle toward the #6 nozzle and from the #10 nozzle toward the #7 nozzle.

Figure 6:
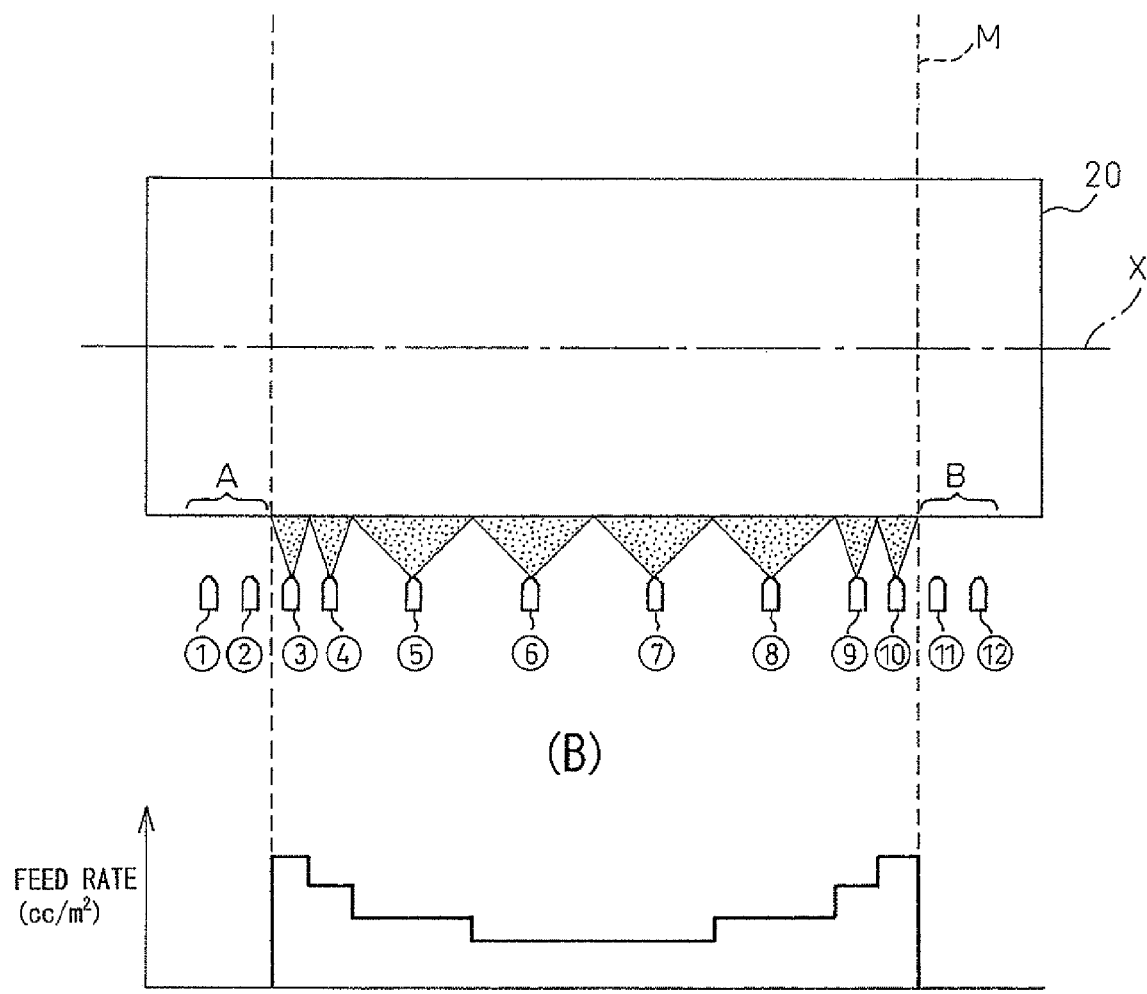
FIG. 6(A) and FIG. 6(B) are schematic views which show a lubricant feed rate from spray nozzles in the equipment for supplying a lubricant according to the present invention.

Further, in the example which is shown in FIG. 6, the width of the metal material M is narrower to a certain extent than the width of the rolling roll 20, and thus the regions of the rolling roll 20 which are supplied with a lubricant by the #1 nozzle, the #2 nozzle, the #11 nozzle, and the #12 nozzle (regions A and B in the figure) do not bite into the metal material M and do not roll the metal material M. Therefore, the regions A and B of the rolling roll 20 do not have to be supplied with a lubricant. For this reason, in the illustrated example, a lubricant is not sprayed from the #1 nozzle, #2 nozzle, #11 nozzle, and #12 nozzle. That is, the lubricant switches 2 corresponding to the #1 nozzle, #2 nozzle, #11 nozzle, and #12 nozzle are turned OFF (when lubricant switches 2 are not provided, outputs of corresponding pump devices 3 are made zero).

Note that, when the width of the metal material is broader than the width of the metal material M which is shown in FIG. 6 and substantially the entire width of the rolling roll 20 grasps and rolls the metal material, a lubricant is sprayed from all of the spray nozzles. In this case, the amount of lubricant supplied from the #1 nozzle and the #12 nozzle are made larger than the amount of lubricant supplied from the #6 nozzle and #7 nozzle. Further, the amount of lubricant supplied of the spray nozzles between the #1 nozzle and the #6 nozzle are made not more than the amount of lubricant supplied from the #1 nozzle and not less than the amount of lubricant supplied from the #6 nozzle. Further, the amount of lubricant supplied of the spray nozzles between the #7 nozzle and the #12 nozzle are made not less than the amount of lubricant supplied from the #7 nozzle and not more than the amount of lubricant supplied from the #12 nozzle.

Summarizing the above, in the present invention, if designating, among the spray nozzles which supply a lubricant to the part of the rolling roll corresponding to the width of the metal material (in the example of FIG. 6, part other than regions A and B) (in the example of FIG. 6, the #3 nozzle to the #10 nozzle), the spray nozzles which are positioned at the two ends (in the example of FIG. 6, the #3 nozzle and the #10 nozzle) as the "side spray nozzles" and the spray nozzles which are positioned at the center as the "center spray nozzles" (in the example of FIG. 6, the #6 nozzle and the #7 nozzle), the amount of lubricant supplied from the side spray nozzles are made greater than the amount of lubricant supplied from the center spray nozzles. In addition, the amount of lubricant supplied from the spray nozzles between these side spray nozzles and center spray nozzles are made not more than the amount of lubricant supplied from the side spray nozzles and not less than the amount of lubricant supplied from the center spray nozzles. Specifically, the amount of lubricant supplied from the side spray nozzles are made not more than 5 times the amount of lubricant supplied from the center spray nozzles, preferably not more than 2 times, further, not less than 1.01 times, preferably not less than 1.03 times. If a ratio less than 1.01 times, the effect of the surface roughness of the roll or the rolled steel material will be felt, and thus no difference will appear in the thickness of the lubricant film in the roll axial direction, and the amount of lubricant supplied from the spray nozzles between the side spray nozzles and the center spray nozzles cannot be changed. If larger than 5 times, the lubricant will pool at the roll bite entry side and the lubricant will flow in from the side spray nozzles to the center spray nozzle supply region, and thus the amount of lubricant supplied will not be able to be changed as intended.

Alternatively, in the present invention, it is also possible to supply a lubricant as explained below. That is, when the width of the metal material is 1000 mm or more, if designating, among the spray nozzles which supply a lubricant to the part of the rolling roll which corresponds to the width of the metal material M (part other than regions A and B of FIG. 6) (in the example of FIG. 6, the #3 nozzle to #10 nozzle), the spray nozzles which supply a lubricant to the side regions of the rolling roll which correspond to distances of 100 mm from the ends of the metal material M as the "side spray nozzles" and the spray nozzles which supply a lubricant to the center region of the rolling roll which corresponds to the 300 mm at the center of the metal material as the "center spray nozzles", the amount of lubricant supplied from the side spray nozzles are made greater than the amount of lubricant supplied from the center spray nozzles. In addition, the amount of lubricant supplied from the spray nozzles between these side spray nozzles and center spray nozzles are made not more than the amount of lubricant supplied from the side spray nozzles and not less than the amount of lubricant supplied from the center spray nozzles.

Note that, in the above-mentioned example, the amount of lubricant supplied to the spray nozzles $1a$ and $1b$ are set in advance for each of the spray nozzles $1a$ and $1b$. However, the amount of lubricant supplied to the spray nozzles $1a$ and $1b$ may also be made individually adjustable during rolling. In this case, the amount of lubricant supplied to the individual spray nozzles $1a$ and $1b$ are adjusted by individually operating electrical devices for adjustment of the constant rate discharge functions of the pumps. These operations include utilization of a computer control system to change the amount of lubricant supplied during rolling in accordance with changes in signals detecting the rolling speed, rolling load, tension, and presence of material or some other signals or manual adjustment of the amount of lubricant supplied of certain specific spray nozzles. The ability for any adjustment method or setting method to be handled is a feature of the present invention. The adjustment method or setting method differs depending on the quality or rolling conditions of the steel material produced by the rolling mill, and thus a method suitable for the usage environment should be used for the operation.

As the method of control of the amount of lubricant supplied to the spray nozzles 1, it may be considered to change the amount of lubricant supplied to the spray nozzles 1 in accordance with the amount of wear of the rolling roll 20. That is, it may be considered to increase by 5 to 90% or so the amount of lubricant supplied to locations of the rolling roll 20 where wear has greatly progressed compared with locations where wear has not progressed.

Specifically, a profile meter (not shown) etc. is used to detect the profile of the rolling roll 20 during rolling. As a result, when dividing the surface of the rolling roll 20 into a plurality of regions in the axial direction, the amount of supplied lubricant is made greater for a region where the amount of wear is larger compared with other regions (region with relatively large amount of wear) compared with a region where the amount of wear is smaller compared with other regions (region with relatively small amount of wear). By performing such control, the amount of lubricant supplied from the spray nozzles consequently become as shown in FIG. 6(B) and as a result the amount of wear of the rolling roll 20 is made uniform in the axial direction.

Alternatively, as the method of control of the amount of lubricant supplied to the spray nozzles, it may be considered to change the amount of lubricant supplied to the spray nozzles in accordance with the surface roughness of the rolling roll 20. Specifically, a surface roughness detection device (not shown) or visual inspection etc. may be used to detect the surface roughness of the rolling roll 20. As a result, if dividing the surface of the rolling roll 20 into a plurality of regions in the axial direction, the amount of supplied lubricant is made greater for a region with a larger surface roughness compared with other regions (region with relatively large surface roughness) compared with a region with a smaller surface roughness compared with other regions (region with relatively small surface roughness). By performing such control, it is possible to suppress variation in the surface roughness of the rolling roll 20 in the axial direction.

In this regard, in the equipment for supplying lubricant of the present invention, a lubricant with a dynamic viscosity at 40° C. of 60 cSt or more and 800 cSt or less is used. Specifically, as the lubricant, for example, a mineral oil-based lubricant, an ester-based lubricant, a lubricant comprised of these plus various additives, and, in addition to organically based ones as well, a non-oil-type lubricant of a colloidal form etc. may be used.

The reason for using a lubricant with a dynamic viscosity at 40° C. of 60 cSt or more is that if using a lubricant with a dynamic viscosity of less than 60 cSt, the deposition ability of the lubricant itself on the roll will become smaller, and a fine particle size mist component will increase when rendering the lubricant a particulate or atomized state, and thus the amount which mist without depositing on the roll will become greater making efficient deposition difficult. On the other hand, the reason for using a lubricant with a dynamic viscosity at 40° C. of 800 cSt or less is that if using a lubricant with a dynamic viscosity larger than 800 cSt, the piping resistance when feeding the lubricant to the spray nozzles will become greater and smooth feed will not be possible unless pumping by a large pressure, and thus constantly and stably spraying a lubricant from the spray nozzles will become difficult and intermittent spraying may easily result. Therefore, it becomes difficult to maintain a uniform state of deposition of lubricant on the roll.

Figure 7:
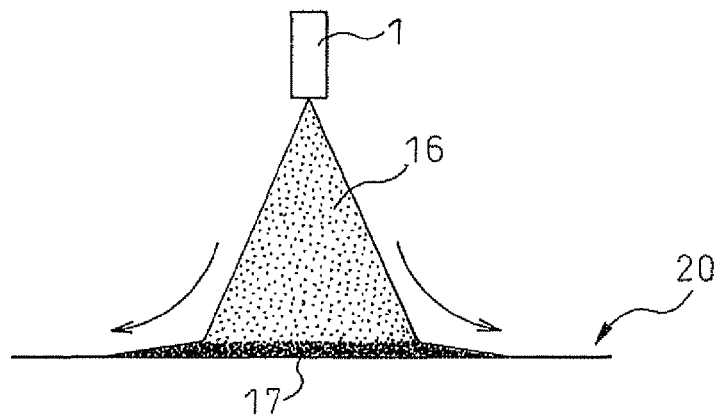
FIG. 7 is a view which shows a state of spraying a lubricant from a spray nozzle in a particulate state or an atomized state.

Here, FIG. 7 shows the state when spraying a lubricant 16 rendered into a particulate or atomized state from a spray nozzle 1 toward the surface of a sprayed object, that is, a rolling roll 20.

To stably spray a lubricant with a dynamic viscosity at 40° C. of 60 cSt or more from the spray nozzle 1 in the particulate or atomized state, the pressure of the gas has to be set at 0.05 MPa or more. Further, the surface of the rolling roll 20 to which the lubricant is supplied always has roll cooling water remaining on it, and therefore to effectively make the lubricant 16 deposit on the rolling roll, the residual roll cooling water on the surface of the rolling roll 20 has to be removed.

For this, the gas which is sprayed from the spray nozzles has to be sprayed by a pressure of at least 0.05 MPa. If spraying the gas by a pressure of at least 0.05 MPa, particulate or atomized lubricant 16 is supplied to the surface of the rolling roll 20 and, simultaneously, the residual roll cooling water is blown away to thereby cause the lubricant to directly deposit on the roll. Further, gas which is sprayed and fed by a pressure of at least 0.05 MPa also exhibits the effect of making the deposited lubricant 17 uniformly even.

On the other hand, if spraying the gas together with the lubricant by a pressure larger than 1.0 MPa gas, even with a lubricant with a dynamic viscosity at 40° C. of 800 cSt, the amount which does not deposit on the roll, but is splattered to the surroundings increases and it becomes difficult to make the intended amount of lubricant deposit on the roll. Not only this, a lubricant is made to deposit at places other than parts where the lubricant is desired to be supplied. This obstructs efficient usage of the lubricant and is uneconomical. Not only that, this is not preferable from the viewpoint of maintenance of a good lubricant usage environment. Therefore, to make the lubricant stably deposit on the rolling roll, the pressure of the gas has to be set to 1.0 MPa or less.

Further, when using an internal mixing type two-fluid spray nozzle, the lubricant and gas are coexistent in the mixing chamber inside of the spray nozzle. For this reason, if the pressure when feeding lubricant to a spray nozzle is lower than the pressure of the gas in the mixing chamber inside the spray nozzle, it will becomes difficult to stably feed lubrication to the mixing chamber inside of the spray nozzle without delay and in some cases the gas will flow back through the lubricant piping.

Therefore, in an internal mixing type two-fluid spray nozzle, to spray a lubricant to a roll while mixing it with a gas in a mixing chamber in the spray nozzle, the pressure at the time of feed of the lubricant to the spray nozzle has to be increased to not less than the pressure of the gas inside of the mixing chamber. Note that, the "pressure of the gas inside of the mixing chamber of the spray nozzle" is the pressure which acts inside of the lubricant piping near the entrance of the lubricant at the spray nozzle when not discharging a lubricant to the spray nozzle, but only feeding gas to the spray nozzle. The pressure inside the mixing chamber depends on the size of the spray ports and other aspects of the structure of the spray nozzle and the original pressure of the applied gas source (pressure inside of piping of gas).

Further, to continuously stably feed spray nozzles with a lubricant having a dynamic viscosity of the lubricant at 40° C. of 60 cSt or more to not more than 800 cSt, while the required pressure changes depending on the piping configuration and length, inside diameter, etc. of the lubrication equipment, a pressure of at least 0.01 MPa has to be applied. If not, piping clogging etc. will occur and stable feed will become difficult. The higher the pressure at the time of feeding the lubricant becomes, the more difficult it becomes for piping clogging to occur. Therefore, the pressure inside the lubricant piping when pumping a lubricant to the spray nozzle is preferably at least 0.01 MPa.

On the other hand, for feed by an extremely high pressure, a large capacity pump device becomes necessary. Also, the pressure resistance ability of the piping also has to be raised and the equipment cost therefore becomes expensive. For this reason, the pressure at the time of feed of the lubricant is preferably kept down to 3 MPa or less. If considering these, the pressure at the time of feed of the lubricant is preferably not less than 0.05 MPa and not more than 3 MPa.

On the other hand, an external mixing type two-fluid spray nozzle differs from an internal mixing type in that there is no chamber for mixing a lubricant and gas inside the spray nozzle and in that spray nozzle a stream of sprayed lubricant and a stream of sprayed gas are made to collide right outside of the spray ports so as to spray and supply a lubricant in a particulate or atomized state on to an object to be sprayed.

Therefore, inside of an external mixing type two-fluid spray nozzle, the flow path of the lubricant and the flow path of the gas are independent from each other, and thus the pressure and other conditions at the time of feeding a lubricant and gas to the spray nozzles almost never affect each other. For this reason, when a lubricant of the above such dynamic viscosity is used, as explained above, from the viewpoints of prevention of piping clogging etc. and keeping down capital costs, a pump device 3 should be used to pump a lubricant to a spray nozzle by a pressure of at least 0.01 MPa to 3 MPa.

However, if feeding a lubricant to the spray nozzles by a pressure higher than the pressure of the gas and spraying the lubricant from the spray nozzles in this way, the pressure of the gas will be insufficient and the lubricant will be sprayed from the spray nozzles in a state made particularly fluid like without forming a particulate or atomized state. This phenomenon particularly easily occurs in a lubricant with a range of dynamic viscosity of the lubricant at 40° C. of 60 to 800 cSt. Therefore, when using external mixing type two-fluid spray nozzles for spraying, the lubricant is pumped by a pressure which is smaller than the feed pressure of the gas to the spray nozzles.

Note that, in the present embodiment, the same number of pump devices 3 as the number of spray nozzles are provided and the amount of lubricant supplied to the spray nozzles are controlled. However, it is also possible to reduce the number of pump devices from the number of spray nozzles and, for example, use a single pump device and provide the same number of flow regulators as the number of spray nozzles. In this case, the amount of lubricant supplied to the spray nozzles are controlled by the flow regulators.

Further, in the above embodiment, internal mixing type two-fluid spray nozzles and external mixing type two-fluid spray nozzles are used. However, it is not absolutely necessary to use both internal mixing type two-fluid spray nozzles and external mixing type two-fluid spray nozzles. It is also possible to use just one type. The type of two-fluid spray nozzles to be used is suitably selected in accordance with the conditions and location for supply of the lubricant.

Note that, for selection of use of these two-fluid spray nozzles, since internal mixing type two-fluid spray nozzles are provided with mixing chambers at the tips of the nozzles, changing the shape of the spray ports of the spray nozzles is easy, and thus these are comparatively used as flat nozzles. A flat nozzle enables a broad range of spraying of a lubricant to be obtained by a single spray nozzle, and thus such a spray nozzle is often suitable for supplying a lubricant to a rolling roll for steel sheet/strip. As opposed to this, an external mixing type two-fluid spray nozzle often has a circular shape of spray port of the spray nozzle, and thus is suitable for uniform spraying and is often used as a round nozzle.

Next, a second embodiment of the present invention will be explained. In this regard, when a large amount of water has been applied to the roll surface to which the lubricant is being supplied or the lubricant has to be supplied in the midst of flying scale etc., the gas has to be sprayed by a pressure of 1.0 MPa or more. At such a time, the amount of the sprayed lubricant which splatters to the surroundings without depositing on the roll, that is, the so-called floating mist, becomes greater. Not only is this inefficient, but it also invites deterioration of the unit consumption of a lubricant.

Figure 8:
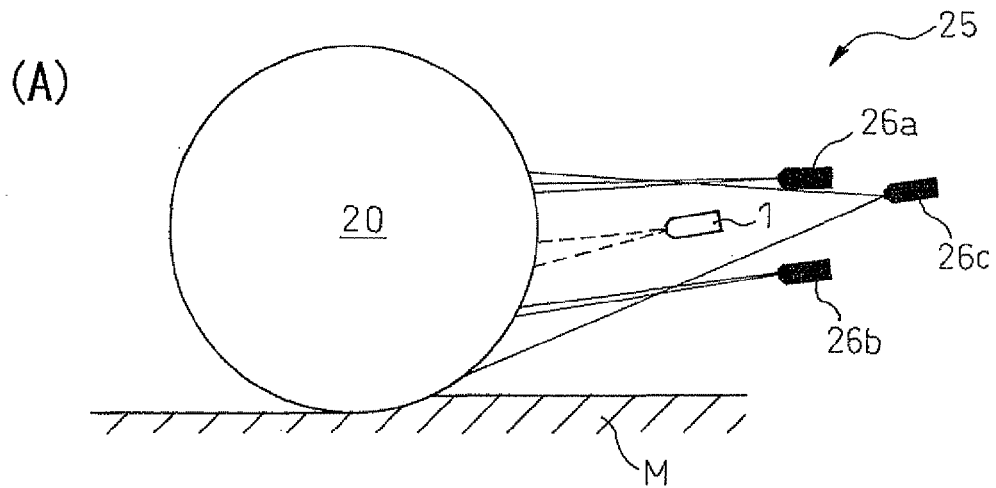
FIG. 8(A) and FIG. 8(B) are views which schematically show a water film forming system.
Figure 8:
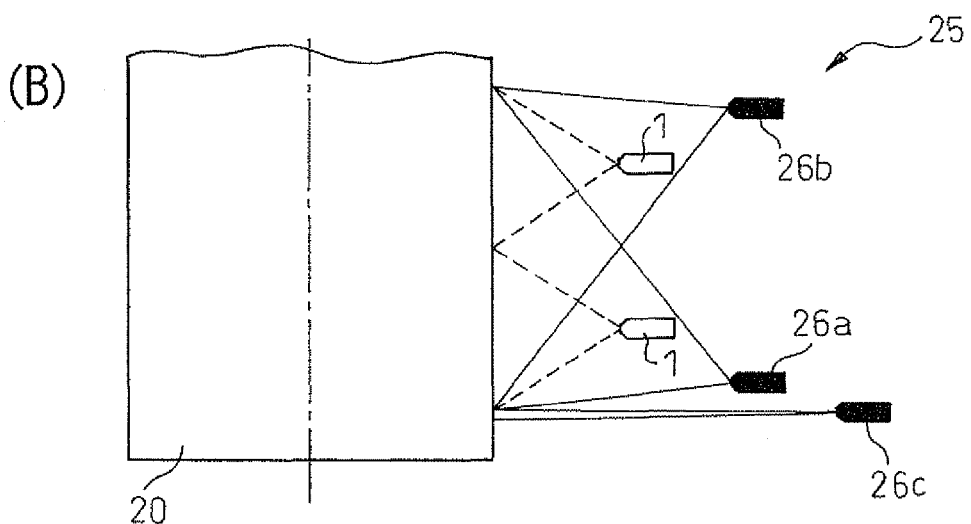

Therefore, in the second embodiment, the spray cones which are formed when spraying a lubricant are covered by water films at their surroundings. FIG. 8(A) is a side view which schematically shows a water film forming system, while FIG. 8(B) is a plan view which schematically shows a water film forming system. FIG. 8(B) shows only the surroundings near the other end of the rolling roll 20.

As will be understood from FIG. 8(A) and FIG. 8(B), the water film forming system 25 is provided with a plurality of water spray nozzles 26 (26a, 26b, 26c) which spray water so as to form water films. The water spray nozzles 26 are provided with a nozzle 26a which forms a water film above spray cones from the spray nozzles of lubricant, a nozzle 26b which forms a water film below the spray cones from the spray nozzles of lubricant, and nozzles 26c which form a water film at the sides (outsides) of the spray cones from the lubricant spray nozzles at the both ends (FIG. 8(B) shows only one). The amount of water which is sprayed changes depending on the spray conditions of the lubricant, but it is preferable to form the water films by a flow rate of at least 1000 cc per minute. By forming water films around the spray cones from lubricant spray nozzles in this way, it is possible to greatly reduce the amount of splatter due to the floating mist.

Note that, as means for forming the water films around the spray cones, in addition to the above-mentioned method of spraying water by installing a nozzles for formation of water films in addition to the two-fluid spray nozzles which spray a lubricant in the above way, the method may be considered of attaching sub nozzles for forming water films at the outside of the two-fluid spray nozzle and forming water films around the spray cones of the lubricant right after nozzle spraying. Any method may be used so long as able to form water films around spray cones from lubricant spray nozzles.

EXAMPLES

The amount of supplied lubricant was controlled at a fifth stand of a hot final rolling mill comprised of a first stand to a seventh stand. The steel material was rolled from the first stand in order to the seventh stand while being rolled. For the rolled steel material, a general low carbon steel was used. It was rolled from a thickness at the first stand entry side of 32 mm to a thickness at the seventh stand exit side of 2.3 mm. As the rolled steel material, one with a width of 1820 mm to 1940 mm was used.

A header comprised of spray nozzles aligned in the axial direction of the rolling roll was installed and gear pumps enabling the amount of supplied lubricant to be individually set were connected to the spray nozzles. At the header, spray nozzles were arranged such as shown in FIG. 5. For the rolling roll, a roll which was measured for roll profile after polishing was used. For the lubricant, one having a dynamic viscosity at 40° C. of 230 cSt was used. For the gas for injection feed use, air was used. The supply of lubricant was started simultaneously with the rolled material being gripped by the rolling mill and was ended simultaneously with the steel material being withdrawn from the fifth stand.

First, lubrication rolling was performed under the lubricant supply conditions which are shown in the conditions of the following Table 1 so as to roll about 245 tons. After that, the roll was pulled out and the roll profile was measured to calculate the average depth of wear for each lubricant supply region of each spray nozzle and the average depth of wear for the roll as a whole. The ratio of the average roll wear depth at the lubricant supply region of each spray nozzle to the roll as a whole was calculated and the ratio was multiplied with the coefficient α (in the present embodiment, 1.0) and the initial amount of lubricant supplied from each spray nozzle (condition of Table 1) to obtain a value which was then used as the amount of supplied lubricant at the time of the next rolling operation. After that, the roll was reinstalled and lubricated rolling was continued until a predetermined rolling amount.

TABLE 1

| Air pressure (MPa) | Internal mixing type | 0.3 |
|---|---|---|
|  | External mixing type | 0.4 |
| Lubricant pressure (MPa) | Internal mixing type | 0.4 |
|  | External mixing type | 0.05 |
| Amount of lubricant per $m^2$ of rolling roll surface area (cc/$m^2$) | Internal mixing type | 1 |
|  | External mixing type | 1 |

The results when measuring the difference between the maximum average wear depth and minimum average wear depth in the roll width direction when repeating roll profile measurement and correction of the amount of supplied lubricant in this way are shown in Table 2. By repeating this lubrication rolling, it is possible to reduced the difference in wear of the roll profile and possible to roll in a state close to the initial roll profile. Note that, in Table 2, the "ratio" expresses the ratio of the amount of lubricant supplied from the side spray nozzles to the amount of lubricant supplied from the center spray nozzle.

TABLE 2

| Rolling am't (tons) | Item | 1 | 2 | 3 | 4 | 5 | 6 | 7 | 8 | 9 | 10 | 11 | 12 | Overall | Wear depth difference | Ratio |
|---|---|---|---|---|---|---|---|---|---|---|---|---|---|---|---|---|
|  | Lubricant spray width (mm) | 100 | 100 | 100 | 100 | 300 | 300 | 300 | 300 | 100 | 100 | 100 | 100 | 2000 | | |
| 0 | Average wear depth (μm) | 0 | 0 | 0 | 0 | 0 | 0 | 0 | 0 | 0 | 0 | 0 | 0 | 0 | 0 | 1.00 |
|  | Amount of supplied lubricant (cc/$m^2$) | 1 | 1 | 1 | 1 | 1 | 1 | 1 | 1 | 1 | 1 | 1 | 1 | — | | |
| 245 | Average wear depth (μm) | 5.4 | 5.6 | 4.8 | 4 | 3.8 | 3.2 | 3.4 | 3.4 | 4.4 | 4.8 | 5.8 | 5.4 | 4.08 | 2.6 | 1.81 |
|  | Amount of supplied lubricant (cc/$m^2$) | 1.32 | 1.37 | 1.18 | 0.98 | 0.93 | 0.78 | 0.83 | 0.83 | 1.08 | 1.18 | 1.42 | 1.32 | — | | |
| 493 | Average wear depth (μm) | 9.2 | 9.4 | 8.6 | 8.4 | 8.2 | 7.6 | 8 | 7.8 | 8.6 | 9 | 9.4 | 9.2 | 8.33 | 1.8 | 1.24 |
|  | Amount of supplied lubricant (cc/$m^2$) | 1.10 | 1.13 | 1.03 | 1.01 | 0.98 | 0.91 | 0.96 | 0.94 | 1.03 | 1.08 | 1.13 | 1.10 | — | | |
| 698 | Average wear depth (μm) | 12.6 | 12.2 | 12 | 12.2 | 12 | 11.6 | 11.8 | 11.8 | 12.2 | 12.4 | 12.8 | 12.6 | 12.03 | 1.2 | 1.10 |
|  | Amount of supplied lubricant (cc/$m^2$) | 1.05 | 1.01 | 1.00 | 1.01 | 1.00 | 0.96 | 0.98 | 0.98 | 1.01 | 1.03 | 1.06 | 1.05 | — | | |
| 1103 | Average wear depth (μm) | 16.4 | 16.4 | 16 | 15.8 | 15.6 | 15.8 | 15.6 | 15.6 | 16 | 16.2 | 1.64 | 1.64 | 15.87 | 0.8 | 1.05 |
|  | Amount of supplied lubricant (cc/$m^2$) | 1.03 | 1.03 | 1.01 | 1.00 | 0.98 | 1.00 | 0.98 | 0.98 | 1.01 | 1.02 | 1.03 | 1.03 | — | | |

Note that, the present invention was described in detail based on specific embodiments, but a person skilled in the art could make various changes, modifications, etc. without departing from the claims and concept of the present invention.

REFERENCE SIGNS LIST

1: lubricant supply nozzle (here, two-fluid gas-liquid mixing and spraying type, gas atomization method use)
1a: internal mixing type two-fluid spray nozzle
1b: external mixing type two-fluid spray nozzle
1': lubricant supply nozzle (single-fluid type, water injection method use)
2: lubricant switch
3: pump device (lubricant discharge use)
3': pump device (water discharge use)
4: lubricant storage tank
5: noncombustible gas source
6: gas switch
8: injector (water and lubricant mixer)
9: water source
10: device for turning feed of water ON/OFF
11: gas
12: pumped lubricant
16: particulate or atomized lubricant
17: lubricant deposited on sprayed object
18: mixing chamber
20: rolling roll
M: metal material (rolled material)
X: axis

The invention claimed is:

1. Equipment for supplying a lubricant for a rolling roll of a rolling mill for a flat shaped metal material, comprising:
a plurality of spray nozzles which are arranged in an axial direction of said rolling roll and which are configured to spray a lubricant to said rolling roll together with a gas in a particulate or atomized state;
a lubricant feed device for feeding the lubricant to the spray nozzles;
a gas feed device for feeding the gas to the spray nozzles; and
a controller for controlling the amount of lubricant supplied from the spray nozzles,
wherein the plurality of spray nozzles comprises side spray nozzles positioned at both ends among the plurality of spray nozzles for supplying the lubricant to the parts of said rolling roll corresponding to end regions of said flat shaped metal material, center spray nozzles positioned at the center among the plurality of spray nozzles for supplying the lubricant to the part of said rolling roll corresponding to the center region of said flat shaped metal material, and spray nozzles between said side spray nozzles and said center spray nozzles,
wherein the amount of lubricant supplied from the side spray nozzles is larger than the amount of lubricant supplied from the center spray nozzles and the amount of lubricant supplied from the spray nozzles between these side spray nozzles and center spray nozzles is not more than the amount of lubricant supplied from said side spray nozzles and not less than the amount of lubricant supplied from said center spray nozzles,
wherein said equipment is configured to individually control the amount of lubricant supplied from each spray nozzle in accordance with a parameter relating to the surface of the rolling roll,
wherein said parameter relating to the surface of the rolling roll is the amount of wear of the rolling roll, and
wherein said lubricant feed device is configured to increase the amount of lubricant supplied to regions of the rolling roll with relatively large amounts of wear compared with regions of the rolling roll with relatively small amounts of wear.

2. Equipment for supplying a lubricant for a rolling roll of a rolling mill as set forth in claim 1, wherein the amount of lubricant supplied from the spray nozzles between the side spray nozzles and center spray nozzles become smaller from the side toward the center of said rolling roll.

3. Equipment for supplying a lubricant for a rolling roll of a rolling mill as set forth in claim 1, wherein the amount of lubricant supplied from said side spray nozzles is up to 5 times the amount of lubricant supplied from said center spray nozzles.

4. Equipment for supplying a lubricant for a rolling roll of a rolling mill for a flat shaped metal material, comprising:
a plurality of spray nozzles which are arranged in an axial direction of said rolling roll and which are configured to spray a lubricant to said rolling roll together with a gas in a particulate or atomized state;
a lubricant feed device for feeding the lubricant to the spray nozzles;
a gas feed device for feeding the gas to the spray nozzles; and
a controller for controlling the amount of lubricant supplied from the spray nozzles,
wherein the plurality of spray nozzles comprises side spray nozzles positioned at both ends among the plurality of spray nozzles for supplying the lubricant to the parts of said rolling roll corresponding to end regions of said flat shaped metal material, center spray nozzles positioned at the center among the plurality of spray nozzles for supplying the lubricant to the part of said rolling roll corresponding to the center region of said flat shaped metal material, and spray nozzles between said side spray nozzles and said center spray nozzles,
wherein the amount of lubricant supplied from the side spray nozzles is larger than the amount of lubricant supplied from the center spray nozzles and the amount of lubricant supplied from the spray nozzles between these side spray nozzles and center spray nozzles is not more than the amount of lubricant supplied from said side spray nozzles and not less than the amount of lubricant supplied from said center spray nozzles, and
wherein at least part of said spray nozzles are internal mixing type spray nozzles, said lubricant has a dynamic viscosity at 40° C. of 60 to 800 cSt, said gas feed device is configured to feed the feeds a gas to said spray nozzles at a pressure of 0.05 MPa or more, and said lubricant feed device is configured to feed the lubricant to said internal mixing type spray nozzles at least at the pressure of the gas in mixing chambers of the spray nozzles or more.

5. Equipment for supplying a lubricant for a rolling roll of a rolling mill as set forth in claim 4,
wherein said spray nozzles are further comprised of internal mixing type spray nozzles and external mixing type spray nozzles, the internal mixing type spray nozzles are arranged at the center in the width direction of said flat shaped metal material, and the external mixing type spray nozzles are arranged at the outside of the rolling roll.

6. Equipment for supplying a lubricant for a rolling roll of a rolling mill for a flat shaped metal material, comprising:

a plurality of spray nozzles which are arranged in an axial direction of said rolling roll and which are configured to spray the lubricant to said rolling roll together with a gas in a particulate or atomized state;

a lubricant feed device for feeding the lubricant to the spray nozzles;

a gas feed device for feeding a gas to the spray nozzles; and a controller for controlling the amount of lubricant supplied from the spray nozzles, wherein the plurality of spray nozzles comprises side spray nozzles positioned at both ends among the plurality of spray nozzles for supplying the lubricant to the parts of said rolling roll corresponding to end regions of said flat shaped metal material, center spray nozzles positioned at the center among the plurality of spray nozzles for supplying the lubricant to the part of said rolling roll corresponding to the center region of said flat shaped metal material, and spray nozzles between said side spray nozzles and said center spray nozzles, wherein the amount of lubricant supplied from the side spray nozzles is larger than the amount of lubricant supplied from the center spray nozzles and the amount of lubricant supplied from the spray nozzles between these side spray nozzles and center spray nozzles is not more than the amount of lubricant supplied from said side spray nozzles and not less than the amount of lubricant supplied from said center spray nozzles, and wherein at least part of said spray nozzles are external mixing type spray nozzles, said lubricant has a dynamic viscosity at 40° C. of 60 to 800 cSt, said gas feed device is configured to feed the gas to said spray nozzles at a pressure of 0.05 MPa or more, and said lubricant feed device is configured to feed the lubricant to said external mixing type spray nozzles at a pressure of at least 0.01 MPa and less than the feed pressure of gas to the spray nozzles.

7. A method of supplying a lubricant to a surface of a rolling roll of a rolling mill, comprising a step of:

spraying a lubricant and a gas in a particulate or atomized state from a plurality of spray nozzles toward said rolling roll, wherein the plurality of spray nozzles comprises side spray nozzles positioned at both ends among the plurality of spray nozzles for supplying the lubricant to parts of said rolling roll corresponding to end regions of said flat shaped metal material, center spray nozzles positioned at the center among the plurality of spray nozzles for supplying the lubricant to the part of said rolling roll corresponding to center region of said flat shaped metal material, and spray nozzles between said side spray nozzles and said center nozzles, and wherein the amount of lubricant supplied from the side spray nozzles is greater than the amount of lubricant supplied from the center spray nozzles, and the amount of lubricant supplied from the spray nozzles between the side spray nozzles and center spray nozzles is not more than the amount of lubricant supplied from said side spray nozzles and not less than the amount of lubricant supplied from said center spray nozzles.

8. A method of supplying a lubricant to a surface of a rolling roll of a rolling mill as set forth in claim 7, wherein the amount of lubricant supplied from the spray nozzles between the side spray nozzles and center spray nozzles is gradually smaller from the side toward the center of said rolling roll.

9. A method of supplying a lubricant to a surface of a rolling roll of a rolling mill as set forth in claim 7, wherein the amount of lubricant supplied from said side spray nozzles up to 5 times the amount of lubricant supplied from said center spray nozzles.

10. A method of supplying a lubricant to a surface of a rolling roll of a rolling mill as set forth in claim 7, wherein the amount of lubricant supplied from the spray nozzles is controlled for each spray nozzle in accordance with a parameter relating to the surface of the rolling roll.

11. A method of supplying a lubricant to a surface of a rolling roll of a rolling mill as set forth in claim 10, wherein said parameter relating to the surface of the rolling roll is the amount of wear of the rolling roll and wherein the amount of supplied lubricant to regions of the rolling roll with relatively large amounts of wear is higher as compared with regions of the rolling roll with relatively small amounts of wear.

12. A method of supplying a lubricant to a surface of a rolling roll of a rolling mill as set forth in claim 7, wherein at least part of said spray nozzles are internal mixing type spray nozzles, said lubricant has a dynamic viscosity at 40° C. of 60 to 800 cSt, and said gas is fed to said internal mixing type spray nozzles at a pressure of 0.05 MPa or more and the lubricant is fed at a pressure of not less than the pressure of the gas in mixing chambers of the spray nozzles.

13. A method of supplying a lubricant to a surface of a rolling roll of a rolling mill as set forth in claim 7, wherein at least part of said spray nozzles are external mixing type spray nozzles and said lubricant has a dynamic viscosity at 40° C. of 60 to 800 cSt, and said gas is fed to said external mixing type spray nozzles at a pressure of 0.05 MPa or more pressure, and the lubricant is fed at a pressure of not less than 0.01 MPa and not more than the feed pressure of gas to the spray nozzles.

* * * * *